F. F. NOXON.
FISH BAIT AND METHOD FOR MAKING THE SAME.
APPLICATION FILED MAR. 23, 1918.
1,291,614. Patented Jan. 14, 1919.
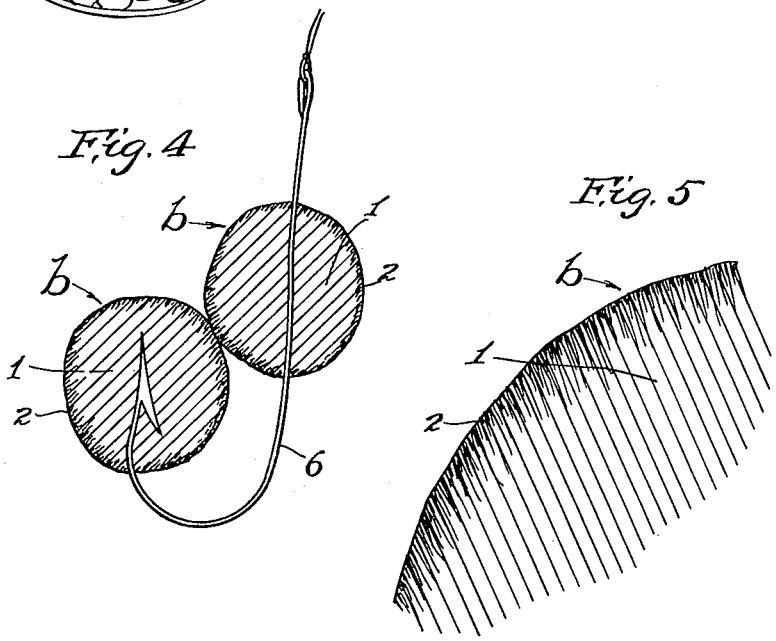

UNITED STATES PATENT OFFICE.

FRANKLIN F. NOXON, OF VENICE, CALIFORNIA, ASSIGNOR OF ONE-HALF TO JOHN J. JENKINS, OF LOS ANGELES, CALIFORNIA.

FISH-BAIT AND METHOD FOR MAKING THE SAME.

1,291,614.     Specification of Letters Patent.     Patented Jan. 14, 1919.

Application filed March 23, 1918. Serial No. 224,394.

*To all whom it may concern:*

Be it known that I, FRANKLIN FOSTER NOXON, a citizen of the United States, residing at 1215 Ballona avenue, in the city of Venice and State of California, have invented and discovered a new and useful Fish-Bait and Method for Making the Same, of which the following is a specification.

An object of the invention is to provide a cheap and effective lure for baiting trout hooks.

Other objects are to provide an edible lure complying with the pure food laws, being non-poisonous in its character. Also to make such lure resemble salmon eggs.

A further object is to provide a lure of this character which will have lasting qualities and will remain firmly on the hook and in which the color will not be dissolved in the water.

Another object is to provide an edible fish lure which has good lasting qualities and is not likely to mold or become rancid.

I have discovered that certain glutinous materials after having taken up the required amount of water and colored to resemble salmon eggs can be given a toughened skin and thereby adapted to be practically used as a bait or lure for catching or enticing fish of varied species.

For example, I select tapioca and prepare same by the following process, although I do not limit myself to this one material as I may select other gums or allied substances.

An object is to produce a fish bait or lure adapted to displace the use of prepared salmon eggs as fish lure.

Other objects and advantages may appear from the accompanying drawing, the subjoined detail description and the appended claims.

The invention and discovery may be understood by reference to the accompanying drawing.

Figure 1 is a view of a mass of bait globules made in accordance with this invention and discovery and contained in a glass jar.

Fig. 2 is a view of one of the bait globules on a trout hook.

Fig. 3 is a view of two of the bait globules on a larger hook.

Fig. 4 is an enlarged view of the globules and hook shown in Fig. 3, the globules being sectioned.

Fig. 5 is a magnified fragmental section of one of the globules.

My newly-discovered artificial fish lure or bait *b* is in the form of glutinous globules and has a hydrated or water impregnated body 1 and a skin 2. In Fig. 1 a mass 3 of the bait globules is shown in a glass jar 4 where they may be kept indefinitely by sealing the jar air tight in any well known way.

My newly discovered and invented bait consists of glutinous globules containing reddish coloring matter and having a toughened envelop or skin.

I may produce this novel bait in various ways and will now describe the method of production in the manner which I now regard as preferable.

I take a quantity of whole tapioca and allow the same to stand in cold water until the tapioca is thoroughly soaked. The tapioca thus becomes swollen and softened. Sufficient swelling will be effected by soaking in cold water for eight hours.

I prepare a coloring and fixing liquid with ingredients in proportion as follows:

Water _____ One pint.
Cochineal __ One teaspoonful.
Sugar _____ Two ounces avoirdupois.

The water, sugar, and cochineal are heated together and stirred until the sugar is dissolved and a deep red syrup is produced, then the syrup is strained through a cheesecloth to remove the cochineal shells. Then a teaspoonful more or less of apple vinegar or some other acid which will serve as an equivalent thereof is added until the syrup is of a salmon-egg color. Then the soaked tapioca is put into the syrup and the whole is brought to a boil. Then the syrup is strained off and the globules of hydrated and cooked tapioca are rinsed in clear cold water until the slime is washed off.

The globules are then about one-fifth or one-quarter of an inch in diameter and closely resemble salmon eggs in appearance, and are found to be measurably toughened and adapted to be retained on a hook.

The globules are then treated to produce a superficial tough skin, to adapt them for greater resistance to the effects of handling and to make them more lasting for the hook. This may be done in various ways. In some instances I have coated the colored tapioca globules with the white of an egg and allowed the coated globules to stand 24 hours. Said globules being immersed in the white of eggs are then laid out upon a plate after they have been coated. They are thus exposed to the air until a toughened external skin is formed.

In other instances I coat the globules by immersing them in fish oil, then strain off the oil, and place the coated globules on a plate and allow them to stand 24 hours.

It is understood that other methods of forming a skin may be employed as for instance, a coat of collodion or of casein. It is preferable, however, to give a final coat of fish oil as a better protection against water and also for the purpose of giving the lure a more natural character and making it very attractive to the fish.

When the bait has thus been prepared it may be put into jars or cans and sealed in any suitable way.

The bait is applied to the hook in the usual way and may be used singly on a small trout hook 5 as shown in Fig. 2 or plurally as on the larger hook 6 in Figs. 3 and 4.

It is thus seen that this novel trout bait or lure comprises a globule of hydrated tapioca having a toughened skin and coloring matter incorporated with said tapioca. The water saturated whole cooked tapioca when prepared in accordance with the method set forth can be put on the hook with ease and will remain firmly thereon under the conditions to which bait is usually subjected.

The fish oil which I have employed has in some instances been commercial fish oil bought in the market and in other instances has been oil obtained by chopping or grinding up fish and letting the same stand in a glass vessel until an oil drains out of the mass and such oil is then separated from the mass and used to saturate the outside skin of said globules.

The sugar which is incorporated in the skin of the globule during the cooking process serves to prevent mold and rancidity.

I claim:—

1. The fish bait set forth comprising a globule of water-saturated whole tapioca having a toughened skin and having coloring matter incorporated in the globule.

2. Fish bait consisting of a cooked and toughened hydrated globule of glutinous material.

3. Fish bait consisting of a cooked and toughened hydrated globule of glutinous material having an outer skin saturated with fish oil.

4. The fish bait set forth comprising a globule of hydrated tapioca having a skin containing sugar, coloring matter and fish oil.

5. The method set forth of producing artificial fish bait or lure which consists in hydrating globules of glutinous material, and then subjecting the same to the action of boiling syrup consisting of water, sugar, cochineal and vinegar.

6. The method set forth of producing artificial fish bait or lure which consists in hydrating globules of glutinous material, and then subjecting the same to the action of boiling syrup containing water and sugar, cochineal and vinegar.

7. Fish bait consisting of a hydrated glutinous globule having a toughened skin containing sugar, cochineal and acid substantially as set forth.

8. Fish bait consisting of a hydrated glutinous globule having a toughened or saturated skin containing sugar, cochineal and acid substantially as set forth.

9. The fish bait set forth consisting of hydrated toughened cooked and colored tapioca.

10. An artificial fish bait or lure comprising a hydrated glutinous substance colored and preserved and hardened by an organic acid.

11. An artificial fish bait or lure comprising a hydrated glutinous substance, colored and preserved, hardened by an organic acid and coated with an albuminous substance.

12. An artificial fish bait or lure comprising a hydrated glutinous substance, colored and preserved, hardened by an organic acid, coated with an albuminous substance and having a film of fish oil.

13. A process for producing an artificial fish bait or lure which consists in hydrating globules of glutinous material and then subjecting same to the action of heat and a colored solution preserved by sugar and hardening by means of an organic acid.

14. A process for producing an artificial fish bait or lure which consists in hydrating globules of glutinous material and then subjecting them to the action of heat and a colored solution preserved by sugar and hardening by means of an organic acid and coating same with an albuminous substance.

15. A process for producing an artificial fish bait or lure which consists in hydrating globules of glutinous material and then subjecting them to the action of heat and a colored solution preserved by sugar and hardening same by means of an organic acid, coating them with an albuminous substance, producing a film, and giving same an odor by means of fish-oil.

In testimony whereof, I have hereunto set my hand at Los Angeles, California, this 12th day of March 1918.

FRANKLIN F. NOXON.

Witness:
JAMES R. TOWNSEND.